(12) United States Patent
Jourday et al.

(10) Patent No.: US 6,625,723 B1
(45) Date of Patent: Sep. 23, 2003

(54) UNIFIED RENAMING SCHEME FOR LOAD AND STORE INSTRUCTIONS

(75) Inventors: Stephen J. Jourday, Hillsboro, OR (US); Adi Yoaz, Talmy-Menache (IL); Ronny Ronen, Haifa (IL); Michael Bekerman, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/348,403

(22) Filed: Jul. 7, 1999

(51) Int. Cl.$^7$ .................................................. G06F 9/38
(52) U.S. Cl. ........................ 712/217; 712/216; 712/225
(58) Field of Search ................................ 712/217, 225, 712/216

(56) References Cited

U.S. PATENT DOCUMENTS

| | | | |
|---|---|---|---|
| 5,644,746 A | * 7/1997 | Holt et al. | 712/217 |
| 5,838,941 A | 11/1998 | Valentine et al. | 712/217 |
| 5,911,057 A | * 6/1999 | Shiell | 712/217 |
| 6,094,716 A | * 7/2000 | Witt | 712/23 |
| 6,122,656 A | * 9/2000 | Witt | 709/100 |
| 6,141,747 A | * 10/2000 | Witt | 712/225 |
| 6,338,134 B1 | * 1/2002 | Leung et al. | 712/217 |

OTHER PUBLICATIONS

"Exdeeding the Dataflow Limit Via Value Prediction", Lipasti, et al., Dept. of Electrical and Computer Engineering Carnegie Mellon Universite, Pittsburgh, PA. 1996 IEEE, pp 226–237.

"Dynamic Instruction Reuse", Sodani, et al., Computer Services Dept. U of WI–Madison, 1997 ACM, pp. 12.

"Dynamic Speculation and Synchronization of Data Dependences", Moshovos, et al., Computer Sciences Dept. U of WI–Madison, Wiscousin, 1997, pp. 12.

"Streaming Inter–operation Memory Communication via Data Dependence Predication" Moshovos, et al., Computer Scineces Dept., U of WI, Madison Wisconsin, IEEE 1997, pp 235–245.

"A Novel Renaming Scheme to Exploit value Temporal Locality through Physical Register Reuse and Unification", Jourdan, et al., Intel Corp., IEEE 1998, pp. 216–225.

Moudgill et al., "Register Renaming And Dynamic Speculation: An Alternative Approach," in Proceedings of the 26th Annual International Symposium on Microarchitecture, IEEE, Dec. 1993, Austin, TX, pp. 202–213.

* cited by examiner

*Primary Examiner*—Kenneth S. Kim
(74) *Attorney, Agent, or Firm*—Seth Z. Kalson

(57) ABSTRACT

A computer architecture for collapsing dependency graphs for colliding store and load instructions. Many-to-one mappings are provided between logical registers and physical registers, so that more than one logical register may map to the same physical register. For a load instruction that is predicted to collide with an earlier in-flight store instruction, the destination logical register of the load instruction is mapped to the same physical register to which the source logical register of the earlier in-flight store instruction is mapped. A many-to-one mapping may be realized by associating a counter with each physical register, so that the value of a counter indicates whether its associated physical counter is free.

16 Claims, 3 Drawing Sheets

UNIFIED RENAMING SCHEME FOR LOAD AND STORE INSTRUCTIONS

FIELD

Embodiments of the present invention relate to computer technology, and more particularly, to processor architecture.

BACKGROUND

Most instructions in a computer instruction set operate on several source operands and generate results. They name, either explicitly or through an indirection, the source and destination locations where values are read from or written to. A name may be either a logical (architectural) register or a location in memory.

Instructions involving only register operands are faster than those involving memory operands. For some microprocessor architectures, instructions naming memory operands are translated (decoded) into micro-instructions that first transfer operand values from memory to logical registers and then perform the indicated computations. However, the number of logical registers is often limited, and as a result, it is important for compilers to efficiently utilize logical registers in order to generate efficient code.

Usually, whenever a logical register is needed for a computation but all available logical registers are in use, a store instruction is inserted in the compiled code so that the content of one of the used logical registers is stored (spilled) into a memory location in order to free up a logical register. A later (in program order) load instruction is then inserted to load from memory the stored value if subsequent instructions need it. As a result, compiled machine code often contains load instructions that access the same memory location as an earlier (in program order) store instruction. In such cases, a load instruction is said to collide with an earlier store instruction.

Usually, the number of physical registers available in a microprocessor exceeds the number of logical registers, so that register renaming may be utilized to increase performance. In particular, for out-of-order processors, register renaming allows instructions to be executed out of their original program order. Thus, for many out-of-order processors, an instruction is renamed so that logical registers named in the original instruction are renamed to physical registers.

Renaming a logical register involves mapping a logical register to a physical register. These mappings are stored in a RAT (Register Alias Table). A RAT maintains the latest mapping for each logical register. A RAT is indexed by logical registers, and provides mappings to corresponding physical registers (dependency-tracking).

Illustrated in FIG. 1 is a register renaming and dependency tracking scheme involving three structures: RAT 110, active list (AL) 102, and free list (FL) 104. For each logical register specified by a renamed instruction (or renamed micro-instruction), an unused physical register from FL 104 is allocated and RAT 110 is updated with this new mapping. Physical registers are free to be used again (i.e., reclaimed) once they cannot be referenced anymore by instructions in the current instruction window.

Based upon the data structures depicted in FIG. 1, one method for register reclaiming is to reclaim a physical register only when the instruction that evicted it from RAT 110, i.e., the instruction that created a new mapping to the physical register, retires. As a result, whenever a new mapping updates RAT 110, the evicted old mapping is pushed into AL 102. (An AL entry is associated with each instruction in the instruction window.) When an instruction retires, the physical register of the old mapping recorded in AL 102, if any, is reclaimed and pushed into FL 104. This cycle is depicted in FIG. 1.

In addition to register renaming, many microprocessors also perform memory renaming utilizing a re-order type buffer called a forwarding buffer. A forwarding buffer stores both memory locations and values as indicated by store instructions. For convenience, we refer to a memory location named in a store instruction as a store instruction address and the value to be stored as a store instruction result. An entry in the forwarding buffer is allocated for every store instruction. The memory hierarchy is updated with a store instruction result only after the store instruction retires. Upon a store instruction retirement, a store buffer may be utilized to store results before updating the memory hierarchy. A store may be visualized as a move from a register (or an immediate value) to the forwarding buffer.

Many prior art microprocessors process load instructions as if dependent upon all earlier (in program order) store instructions. In this way, a load instruction does not start execution until all earlier store instructions have finished execution. A load instruction address (i.e., the memory location of the value to be loaded) is checked with addresses in the forwarding buffer and the memory cache (and perhaps store buffer). If there is a hit in the forwarding buffer, then the result is loaded from the entry in the forwarding buffer corresponding to the youngest store instruction (latest in program order) in the forwarding buffer having a store instruction address matching the load instruction address.

Because of the number of load instructions that collide with earlier store instructions, greater processing throughput may be realized for microprocessors having architectures that process colliding store and load instructions more efficiently than in the prior art.

SUMMARY

Embodiments of the present invention are directed to a unified renaming scheme in which more than one logical register may be mapped to the same physical register. One embodiment comprises a physical register file and a register allocation table for storing mappings between logical and physical mappings. If a load instruction is predicted to collide with an earlier in-flight store instruction, then the register allocation table maps the source logical register named in the in-flight store instruction and the destination logical register named in the load instruction to the same physical register.

DETAILED DESCRIPTION OF EMBODIMENTS

Figure 2:
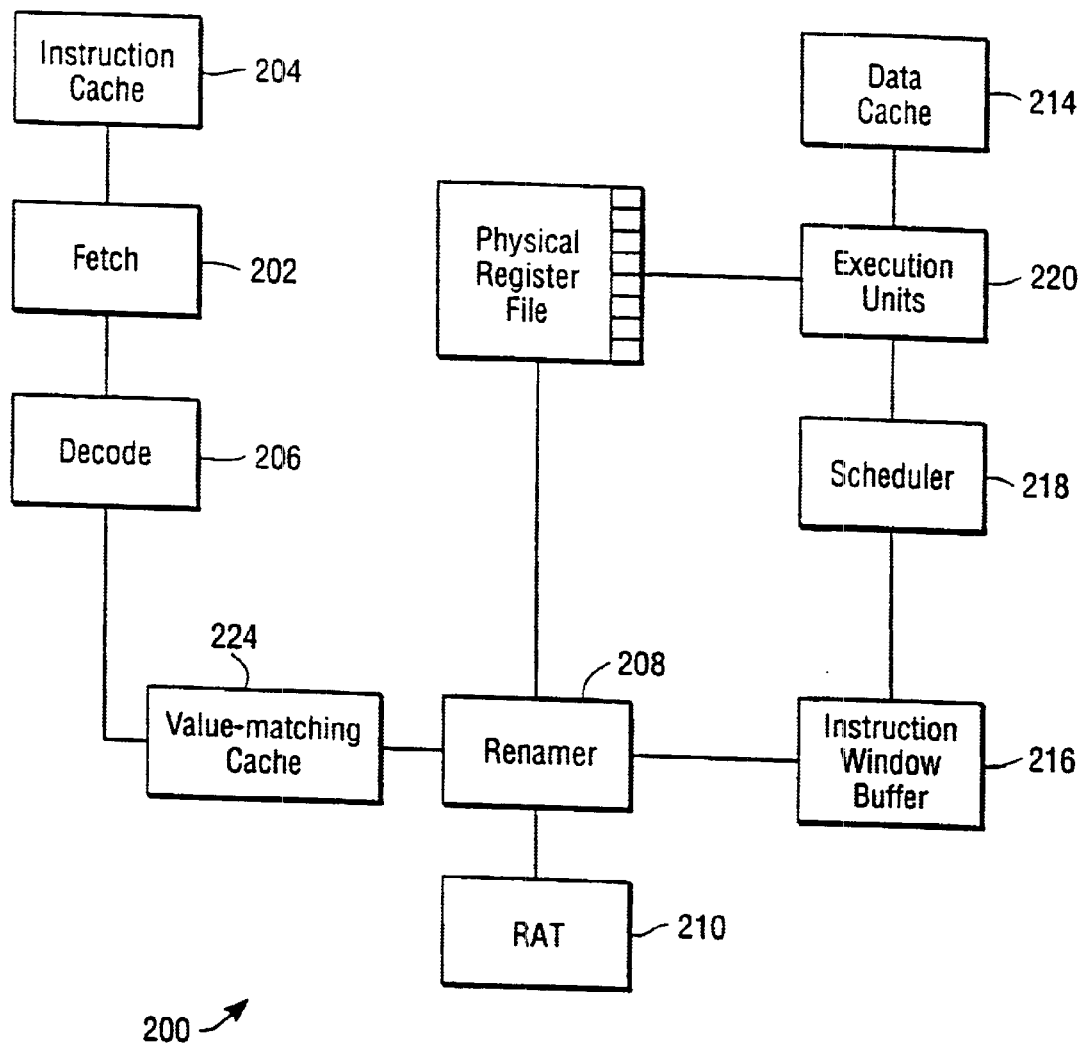
FIG. 2 illustrates the high level architecture of a microprocessor according to an embodiment of the present invention.
Figure 3:
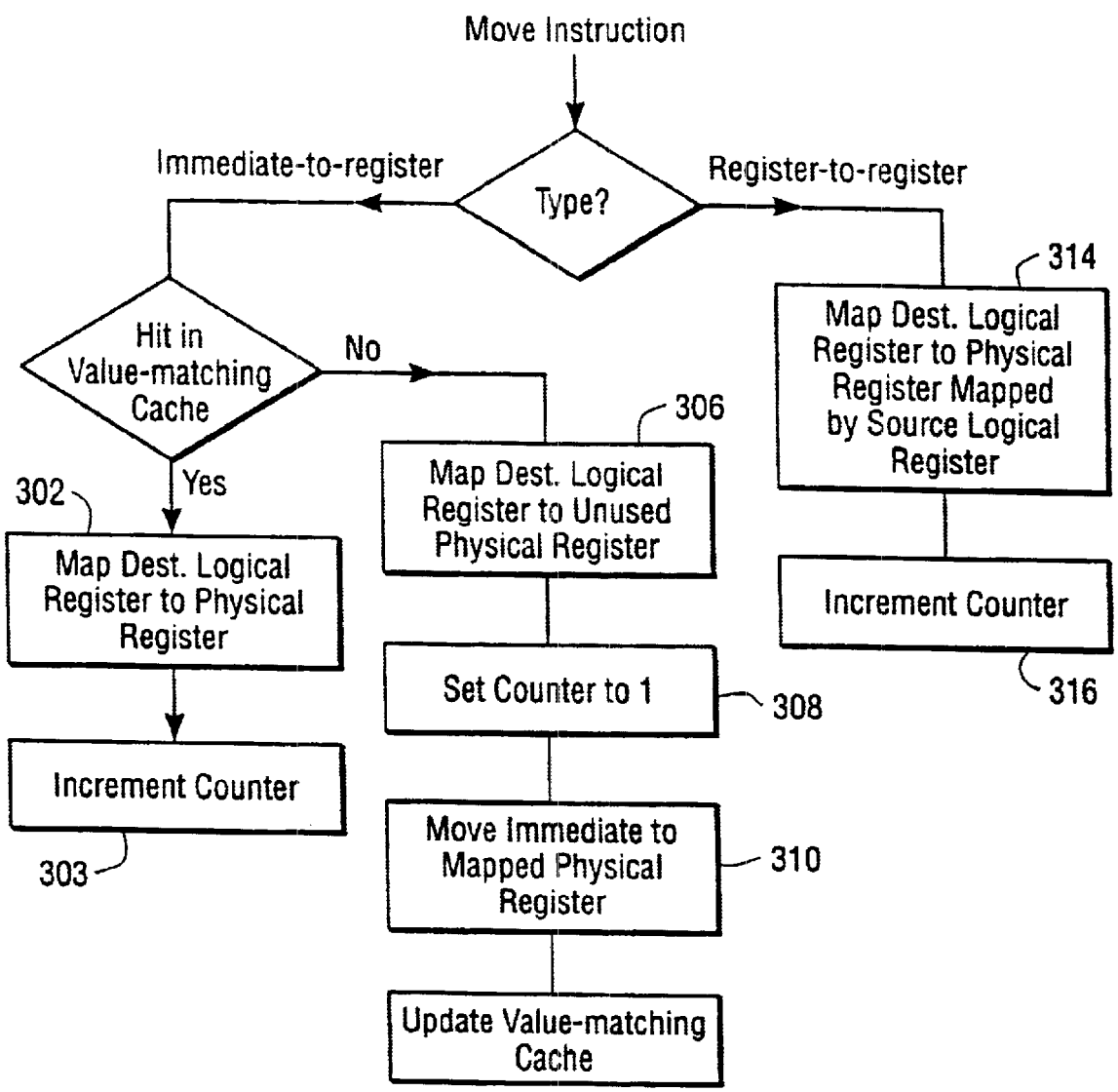

Embodiments of the present invention may be described by referring to out-of-order microprocessor 200 of FIG. 2. (For simplicity, not all functional units of microprocessor 200 are illustrated.) In microprocessor 200, fetch unit 202 fetches instructions from instruction cache 204, and decode unit 206 decodes these instructions. For a CISC (Complex Instruction Set Computer) architecture, decode unit 206 decodes a complex instruction into one or more micro-instructions. Usually, these micro-instructions define a load-store type architecture, so that micro-instructions involving memory operations are simple load or store operations. However, the present invention may be practiced for other architectures, such as for example RISC (Reduced Instruction Set Computer) or VLIW (Very Large Instruction Word) architectures.

For a RISC architecture, instructions are not decoded into micro-instructions. Because the present invention may be practiced for RISC architectures as well as CISC architectures, we shall not make a distinction between instructions and micro-instructions unless otherwise stated, and will simply refer to these as instructions.

In FIG. 2, the register renaming functional unit is indicated by renamer unit 208, where RAT (Register Allocation Table) 210 contains current mappings between logical registers and physical registers. The physical registers are indicated by register file 212. Every logical register has a mapping to a physical register in physical register file 212, where the mapping is stored in RAT 210 as an entry. An entry in RAT 210 is indexed by a logical register and contains a pointer to a physical register in physical register file 212. Some registers in physical register file 212 may be dedicated for integers whereas others may be dedicated for floating point numbers, but for simplicity these distinctions are not indicated in FIG. 2.

During renaming of an instruction, current entries in the RAT provide the required mapping (or mappings) for renaming the source logical register (or registers) of the instruction, and a new mapping is created for the destination logical register of the instruction. This new mapping evicts the old mapping in the RAT, and the RAT is updated with this new mapping.

Table 1 illustrates an example of register renaming. In Table 1, four instructions in original program order are provided in the first column. Renamed instructions are indicated in the second column. Next to each renamed instruction are the current entries in the RAT after instruction renaming. The final column provides the mapping evicted by instruction renaming. For simplicity, only three logical registers, LRa, LRb, and LRb, are considered. A physical register is denoted by PRi where i is an integer. The first entry in Table 1 provides the current state of the RAT before the first listed instruction is renamed.

For example, in Table 1 the first instruction LRa+2→LRa (indicating that the immediate 2 is added to the value in logical register LRa and the result is stored in logical register LRa) is renamed to PR1+2→PR2, where physical register PR2 was assumed to be available. For this instruction, a new mapping LRa→PR2 was created and the old mapping LRa→PR1 was evicted from the RAT.

Note that there is a true dependence of the second and fourth instructions upon the first instruction, and a true dependence of the third instruction upon the second instruction. However, register renaming has removed the output dependency between the second and fourth instructions, as well as the anti-dependence between the third and fourth instructions, so that the second, third, and fourth instructions may be executed out of order provided the execution order follows the various true dependencies.

TABLE 1

| Instruction | Renamed Instruction | RAT | Evicted Mapping |
|---|---|---|---|
| ... | ... | LRa → PR1<br>LRb → PR11<br>LRc → PR10 | ... |
| LRa + 2 → LRa | PR1 + 2 → PR2 | LRa → PR2<br>LRb → PR11<br>LRc → PR10 | LRa → PR1 |
| LRa + 3 → LRb | PR2 + 3 → PR12 | LRa → PR2<br>LRb → PR12<br>LRc → PR10 | LRb → PR11 |
| LRb + 2 → LRc | PR12 + 2 → PR13 | LRa → PR2<br>LRb → PR12<br>LRc → PR13 | LRc → PR10 |
| LRa + 5 → LRb | PR2 + 5 → PR14 | LRa → PR2<br>LRb → PR14<br>LRc → PR13 | LRb → PR12 |

Renamed instructions are placed in instruction window buffer 216. Entries in instruction window buffer 216 contain the opcode of the renamed instruction, as well as other fields to be described later. However, the results of instructions are not stored in buffer 216 but reside in physical register file 212.

Instruction window buffer 216 allows for instruction retirement in original program order. For CISC architectures, a complex instruction is retired when all micro-instructions making up the complex instruction are retired together. Buffer 216 is operated as a circular buffer, where a first pointer points to the next instruction to be retired and a second pointer points to the next available entry for a newly decoded instruction. Incrementing the pointers is done in modulo-N arithmetic, where N is the number of available entries in buffer 216. When an instruction retires, the first pointer is incremented. When a decoded instruction is placed in buffer 216, the second pointer is incremented. The pointers are incremented by one for each decoded instruction in a RISC architecture, and may be incremented by more than one for CISC architectures.

For a store instruction specifying a write to a memory location, data cache 214 (part of the memory hierarchy) is eventually updated after instruction retirement. In some embodiments, writes to a memory location may first be placed in a store buffer, after which data cache 214 is updated at a later time. Some embodiments may also have forwarding buffer 226. Forwarding buffer 226 has entries for renamed store instructions, as well as other fields, which will be described in more detail later.

For an instruction specifying a write to a logical register, no write need be done upon retirement because there are no registers dedicated as logical registers. For such an instruction, physical register file 212 has the result of the retiring instruction in the physical register to which the destination logical register was mapped when the instruction was renamed.

Scheduler 218 schedules instructions to execution units 220 for execution. The scheduling function may, for example, be realized by reservation stations (not shown) implementing Tomasulo's algorithm (or variations thereof). Execution units 220 may retrieve data from or send data to data cache 214 or physical register file 212, depending upon the instruction (or micro-instruction) to be executed.

In other embodiments of the present invention, the information content contained in the data structures of physical register file 212 and instruction window buffer 216 may be realized by different functional units. For example, a re-order buffer may replace instruction window buffer 216 and physical register file 212, so that results are stored in the re-order buffer, and in addition, registers in a register file are dedicated as logical registers. For this type of embodiment, the result of an instruction that specifies a write to a logical register is written to a logical register upon instruction retirement.

When a load instruction is decoded, dependency predictor 224 predicts which store instruction in instruction window buffer 216, if any, collides with the load instruction. Such dependency predictors are known in the art, and functional unit 224 represents any type of dependency predictor. See, for example, "Dynamic Speculation and Synchronization of Data Dependencies", Andreas Moshovos, Scott E. Breach, T. N. Vijaykumar and Gurindar S. Sohi, *Proceedings of the 24th International Symposium on Computer Architecture*, Denver, Jun. 2–4, 1997.

For embodiments of the present invention, when a load instruction is predicted to collide with a store instruction in the instruction window buffer in which the memory hierarchy has not yet been updated with the store instruction result, the destination logical register of the load instruction is mapped to the same physical register that the source logical register of the store instruction is mapped. Consequently, the mapping of logical registers to physical registers may be a many-to-one mapping because more than one logical register may map to the same physical register. Dependency graphs are collapsed since instructions dependent on such renamed load instructions are made directly dependent on the real producer (dependencies are redirected). In this way, the forwarding buffer need not be accessed to obtain the result of the load. There may also be a reduction in the requirement for physical registers, and there may be fewer writes into the register file.

Embodiments of the present invention provide a mechanism for mapping more than one logical register to the same physical register. These many-to-one mappings are facilitated by utilizing set of counters 222, where a counter is provided for each physical register in physical register file 212. The value of a counter indicates whether its associated physical register is free. For simplicity of discussion, we may take a counter value of zero to imply that there are no current mappings to the physical register and that it is free. (However, embodiments of the present invention are not limited to using counter values of zero to indicate that a physical register is free.)

Each time a new mapping between a logical register and a physical register is created, the counter associated with that physical register is changed by a first increment. In some embodiments, the first increment is positive, so that the counter is incremented for each new mapping. When a mapping to a physical register is no longer needed, its counter is changed by a second increment opposite in sign to the first increment.

A physical register becomes free again if there are no longer any mappings to it that are needed by in-flight instructions. A counter associated with a physical register is changed by the second increment (e.g., the counter is decremented) each time an instruction that evicted a mapping to the physical register retires. When a counter reaches a pre-determined value (e.g., zero), then that physical register is free.

In some embodiments of the present invention, instruction window buffer 216 has pointer fields for pointing to physical registers. When an instruction placed in instruction window buffer 216 has evicted a mapping in RAT 210, a pointer field associated with the instruction is set to point to the physical register of the evicted mapping. These pointer fields comprise an active list. (The free list may be a queue of pointers pointing to free physical registers.) As each instruction retires in instruction window buffer 216, the counter associated with the physical register (if any) pointed to by the pointer field associated with the retiring instruction is changed by the second increment (e.g., the counter is decremented).

Figure 1:
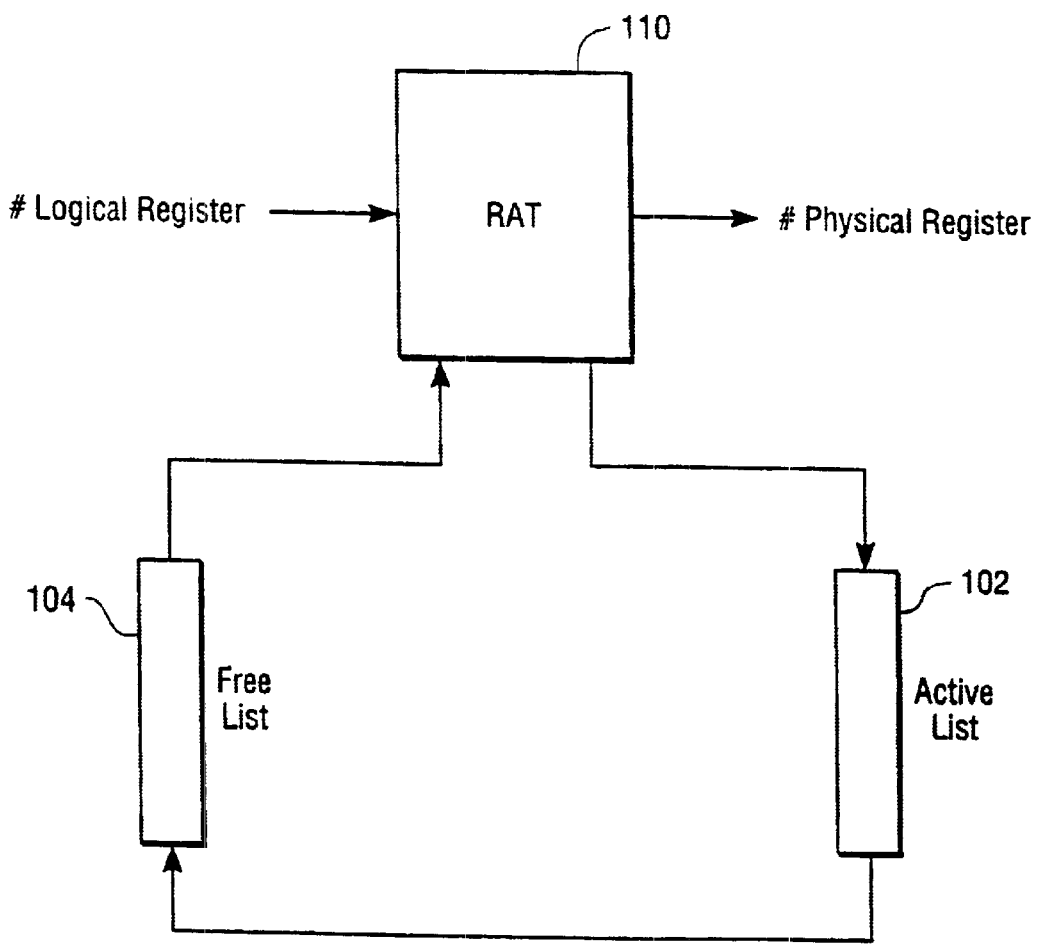
FIG. 1 illustrates a prior art register renaming and dependency tracking scheme.

In this way, the use of set of counters 222 ensures that no physical register is lost during the cycle depicted in FIG. 1. The maximum number of concurrent mappings to a given physical register depends upon the number of bits allocated to its associated counter. Note that there may be more mappings than there are logical registers, because the number of instructions in flight may (and most likely will) be larger than the number of logical registers.

Every logical register has a mapping in the RAT. Although the renaming of a store instruction does not evict a mapping in the RAT and does not create a new mapping, in some embodiments the counter associated with the physical register named in a renamed store instruction is changed by the first increment (e.g., the counter is incremented) to indicate that a store instruction has been renamed. When the store instruction retires, the counter value associated with the physical register is changed by the second increment (e.g., the counter is decremented). In this way, for these embodiments the physical register named in a store instruction will not be free as long as the store instruction is still in-flight, and dependency graphs may still be collapsed for colliding load instructions by re-using the physical register.

For some embodiments, the store buffer may be eliminated, its function being replaced by the forwarding buffer. For such embodiments, a store instruction in the forwarding buffer may be in one of three states: i) renamed but not yet retired; ii) retired, but where the memory hierarchy has not yet been updated with the store instruction result; and iii) retired and in which the memory hierarchy has been updated. For a load instruction predicted or known to collide with a store instruction in the forwarding buffer, the destination logical register named by the load instruction is mapped to the same physical register to which the source logical register of the store instruction is mapped. The counter associated with the physical register named in a renamed store instruction is changed by the first increment (e.g., the counter is incremented) when the store instruction enters state i. When a store instruction enters state iii, its entry in the forwarding buffer is available to be over-written by a new entry. In one embodiment, the counter associated with the physical register named in a renamed store instruction is changed by the second increment (e.g., the counter is decremented) when the forwarding buffer entry containing the renamed store instruction is over-written by a new entry.

If the instruction window buffer and the forwarding buffer are large enough so that colliding store instructions are still in the forwarding buffer in state i or ii, then the efficiency obtained in re-using physical registers as described above may be taken advantage of In some embodiments, the forwarding buffer may be part of the instruction window buffer. If, however, the forwarding buffer is separate from the instruction window buffer, then it may be large enough so that it contains store instructions that have since been retired and removed from the instruction window buffer. Consequently in some embodiments, entries in the forwarding buffer also contain pointers to physical registers, so that when a load is predicted to collide with a store instruction in the forwarding buffer, the physical register named in the renamed store instruction may be obtained from the forwarding buffer, even if the store instruction is no longer in the instruction window buffer. This is done prior to load renaming. The forwarding buffer may be implemented as a FIFO (First-In-First-Out) buffer, although other structures may be used. Table 2 provides an example of register re-use. In Table 2, the notations LR→[x] and [x]→LR indicate, respectively, store and load instructions naming a memory location having an address [x]. In practice, the address of a memory location may not yet be known when the store or load instruction is decoded. For example, the memory location may be the value of the destination logical register of an earlier instruction which has not yet completed execution. When a store or load instruction is renamed in which the memory location is specified by a logical register, the physical register to which the logical register currently maps in the RAT is used in instruction renaming. However, for simplicity and ease of discussion, substitution of a physical register for a logical register used to name a memory location is not indicated in Table 2, so that we simply write [A] as the actual memory location even though in practice it may not be known during instruction renaming.

In Table 2, an additional column is added to indicate the current state of the physical register counters (only a few of the physical register counters are illustrated). The first entry in Table 2 provides the current state of the RAT and the physical register counters before the first displayed instruction is renamed. Note that initially, physical register PR12 is free for a new mapping because its counter value is zero.

Next to each renamed instruction is a pointer indicating the physical register named in the evicted mapping. For example, when the second displayed instruction in Table 2 is placed in the instruction window buffer, the pointer field associated with its entry is set to point to physical register PR11 because the renamed instruction evicted the mapping LRb→PR11. Furthermore, because physical register PR12 has now been allocated in the new mapping LRb→PR12, its counter is incremented by one.

The first displayed instruction in Table 2 is a store instruction to store the contents of logical register LRa in memory location [A]. A store instruction does not create a new mapping and therefore does not evict an old mapping from the RAT. In the embodiment illustrated by Table 2, when a store instruction is renamed, the counter associated with the physical register to which its source logical register is mapped, $C_1$, is incremented by one.

The last displayed instruction in Table 2 is a load instruction to load the contents of memory location [A] to logical register LRb. This load instruction collides with the first displayed instruction in Table 2 because it refers to the same memory location and there are no intervening stores that refer to the same memory location. However, the renaming of a load instruction depends upon whether it is predicted to collide with an earlier store instruction in the instruction window. In the example of Table 2, the load instruction is predicted to collide with the earlier store instruction. In this case, its destination logical register is mapped to the same physical register that the source logical register of the colliding store instruction is mapped, and the counter associated with this physical register is incremented to denote the new mapping. If the load instruction in Table 2 is predicted not to depend upon the store instruction, then it destination logical register is mapped to a free physical register.

Note that because renaming of the colliding store instruction caused the counter $C_1$ to increment by one, the physical register to which its source logical register was mapped will not be free if the colliding store instruction has not been over-written in the forwarding buffer, and therefore this physical register still has the value to be stored in memory location [A].

The third displayed instruction in Table 2 is a register-to-register move and re-uses physical register PR12 so that its destination logical register is mapped to the same physical register mapped by its source logical register. Execution of this move instruction is performed by the renaming, but an entry in the instruction buffer window is still provided so that the pointer field associated with its entry is set to point to physical register PR10. Note that the counter for physical register PR12 is incremented from one to two (its value was set to one in the previous instruction). Thus, embodiments of the present invention provide a unified renaming scheme for both register instructions, e.g., move instructions, as well as memory instructions, e.g., store and load instructions.

TABLE 2

| Instruction | Renamed Instruction with pointer | RAT | Evicted Mapping | Counters | |
|---|---|---|---|---|---|
| . . . | . . . | LRa → PR1<br>LRb → PR11<br>LRc → PR10 | . . . | $C_1 = 1$<br>$C_{11} = 2$ | $C_{11} = 1$<br>$C_{12} = 0$ |
| LRa → [A] | PR1 → [A] | LRa → PR1<br>LRb → PR11<br>LRc → PR10 | | $C_1 = 2$<br>$C_{10} = 2$ | $C_{11} = 1$<br>$C_{12} = 0$ |
| LRa + 3 → LRb | PR1 + 3 → PR12; 11 | LRa → PR1<br>LRb → PR12<br>LRc → PR10 | LRb → PR11 | $C_1 = 2$<br>$C_{10} = 2$ | $C_{11} = 1$<br>$C_{12} = 1$ |
| LRb → LRc | PR12 → PR12; 10 | LRa → PR1<br>LRb → PR12<br>LRc → PR12 | LRc → PR10 | $C_1 = 2$<br>$C_{10} = 2$ | $C_{11} = 1$<br>$C_{12} = 2$ |
| [A] → LRb | [A] → PR1; 12 | LRa → PR1<br>LRb → PR1<br>LRc → PR12 | LRb → PR12 | $C_1 = 3$<br>$C_{10} = 2$ | $C_{11} = 1$<br>$C_{12} = 2$ |

As described previously, when an instruction that evicted a mapping retires, the counter pointed to by its associated pointer field (i.e., the counter associated with the physical register in the evicted mapping) is decremented. In the case of a store instruction, the counter associated with the physical register to which its source logical register is mapped is decremented when the store instruction in the forwarding buffer is over-written.

For each load instruction predicted to collide with an earlier in-flight store instruction, a check should be performed to verify that the prediction was correct. Two embodiments providing this function are described as follows. For the first of these two embodiments, verification is done by comparing addresses, whereas for the second embodiment, verification is done by comparing results. For both embodiments, when renaming a load instruction predicted to collide with a store instruction, the load instruction is translated into a load-check instruction and made dependent upon all earlier store instructions. (In the description below, for simplicity the terms "load instruction" and "load-check instruction" will be used interchangeably.)

For the first embodiment, a load-check instruction checks all addresses in the forwarding buffer corresponding to earlier in program-order store instructions and returns a pointer to the youngest store instruction, if any, in the forwarding buffer having a store instruction address matching the load-check instruction address. If this pointer points to the same store instruction that the load-check instruction was predicted to collide with, then the prediction was correct. If this pointer does not point to the predicted store instruction, then the prediction was incorrect. If the pointer is not valid because there is no store instruction in the forwarding buffer having a store instruction address that matches the load-check instruction address, then the prediction was incorrect.

If the prediction was incorrect, then instructions past the load instruction may have executed with incorrect results because of the misprediction. One method for recovery is to flush the pipeline of all instructions past the mispredicted load instruction, restore the RAT and physical register counters as they were just before the load instruction was renamed (this requires storing checkpoints just before renaming of load instructions that are predicted to collide with earlier store instructions), and rename the load instruction. In this case, the load instruction obtains its result from the memory location specified by the load instruction.

For the second embodiment, when a load-check instruction executes, the memory hierarchy is accessed at the memory location specified by the load instruction to obtain the load instruction result. This result is compared with the value stored in the physical register to which the destination logical register of the load instruction is mapped to. Note that this physical register still contains the result of the store instruction that the load instructions was predicted to collide with because its associated counter will not indicate that the physical register is free if the load instruction has not yet retired. If these two values match, then a prediction is declared. If they do not match, then a misprediction is declared. Note that there is a possibility that the load and store instructions have the same result even if they in fact did not actually collide. In this case, declaring a prediction is still correct in the sense that instructions directly dependent upon the load instruction obtained the correct load result.

Various modifications may be made to the disclosed embodiments without departing from the scope of the invention as claimed below. For example, in some embodiments, load instructions need not be made dependent upon all prior store instructions. In the claims below, the term "instruction" may encompass an instruction in a RISC architecture or an instruction in a CISC architecture, as well as instructions used in other computer architectures.

We claim:

1. A microprocessor comprising:
   a physical register file comprising physical registers;
   a decoder to decode a load instruction naming a destination logical register;
   a register allocation table to map the destination logical register, wherein if the load instruction is predicted to collide with an in-flight store instruction naming a source logical register, where the source logical register is mapped to a physical register, then the register allocation table maps the destination logical register to the physical register; and
   a plurality of counters in one-to-one correspondence with the physical register file, where each counter indicates a number of mappings to its corresponding physical register.

2. The microprocessor as set forth in claim 1, wherein a counter associated with the physical register is changed by an increment if a new mapping to the physical register is created in the register allocation table.

3. The microprocessor as set forth in claim 2, wherein the increment is positive.

4. The microprocessor as set forth in claim 1, wherein a counter associated with the physical register is changed by a first increment if a store instruction is decoded in which the store instruction names a source logical register mapped to the physical register.

5. The microprocessor as set forth in claim 4, further comprising a buffer to retire instructions in program order so that the counter is changed by a second increment if the store instruction retires, where the second increment is opposite in sign to the first increment.

6. The microprocessor as set forth in claim 4, further comprising a forwarding buffer having an entry to contain information indicative of the store instruction so that the counter is changed by a second increment if the entry information is over-written, where the second increment is opposite in sign to the first increment.

7. A microprocessor comprising:
   a physical register file comprising physical registers;
   a decoder to decode a store instruction indicating a source logical register and to decode a load instruction indicating a destination logical register;
   a register allocation table to store mappings between logical registers and physical registers, wherein the source logical register maps to a first physical register and the destination logical register maps to a second physical register, and
   a plurality of counters in one-tone correspondence with the physical register file to indicate numbers of mappings to the physical registers, wherein a counter associated with the first physical register is changed by a first increment in response to the decoding of the store instruction.

8. The microprocessor as set forth in claim 7, furrier comprising a buffer to retire instructions in program order so that the counter associated with the first physical register is changed by a second increment if the store instruction retires, where the second increment is opposite in sign to the first increment.

9. The microprocessor as set forth in claim 7, further comprising a forwarding buffer having an entry to contain information indicative of the store instruction so that the counter is changed by a second increment if the entry information is over-written, where the second increment is opposite in sign to the first increment.

10. The microprocessor as set forth in claim 7, further comprising a predictor to predict whether the load instruction collides with the store instruction if both the store and load instructions are in-flight, wherein the source and destination logical register mappings are such that the first and second physical registers are the same if the load instruction is predicted to collide with the store instruction.

11. A microprocessor comprising:

a physical register file comprising physical registers;

a decoder to decode store instructions, wherein a store instruction names a source logical register and a store memory location, and to decode load instructions, wherein a load instruction names a destination logical register and a load memory location;

a register allocation table to map logical registers to physical registers;

counters in one-to-one correspondence with the physical registers, each counter to indicate a number of mappings to its corresponding physical register;

a renamer to rename store instructions to renamed store instruction, wherein a renamed store instruction has a pointer to a physical register to which its source logical register is mapped;

a forwarding buffer to have entries for renamed store instructions, wherein an entry associated with a renamed store instruction has a field to contain a physical register pointer and a field to contain a store memory location of the renamed store instruction; and wherein if a load instruction having a destination logical register is predicted to collide with a renamed store instruction having a physical register pointer in the forwarding buffer, then the register allocation table maps the destination logical register to a physical register pointed to by the physical register pointer.

12. The microprocessor as set forth in claim 11, wherein a physical register is not free if pointed to by a physical register pointer associated with a renamed store instruction in the forwarding buffer.

13. The microprocessor as set forth in claim 11, wherein a counter associated with a physical register is changed by an increment if pointed to by a physical register pointer in the forwarding buffer at is over-written.

14. A method to map logical registers to physical registers, the method comprising:

predicting whether a load instruction naming a destination logical register collides with an in-flight store instruction naming a source logical register, where the source logical register is mapped to a physical register;

mapping the destination logical register to the physical register if the collision is predicted; and incrementing a counter associated with the physical register by an increment if a new mapping to the physical register is created.

15. A computer system comprising:

a memory hierarchy;

a microprocessor coupled to the memory hierarchy, the microprocessor comprising:

a physical register file comprising physical registers;

a decoder to decode a load instruction naming a destination logical register;

a register allocation table to map the destination logical register, wherein if the load instruction is predicted to collide with an in-flight store instruction naming a source logical register, where the source logical register is mapped to a physical register, then the register allocation table maps the destination logical register to the physical register, and a plurality of counters in one-to-one correspondence with the physical register file, where each counter indicates a number of mappings to its corresponding physical register.

16. The computer system as set forth in claim 15, wherein a counter associated with the physical register is changed by an increment if a new mapping to the physical register is created in the register allocation table.

* * * * *

UNITED STATES PATENT AND TRADEMARK OFFICE
CERTIFICATE OF CORRECTION

PATENT NO. : 6,625,723 B1
DATED : September 23, 2003
INVENTOR(S) : Jourdan et al.

It is certified that error appears in the above-identified patent and that said Letters Patent is hereby corrected as shown below:

Title page,
Item [12], delete "Jourday", insert -- Jourdan --.
Item [75], Inventors, delete "Stephen J. Jourday", insert -- Stephan J. Jourdan --.

Column 11,
Line 20, delete "instruction", insert -- instructions --.

Signed and Sealed this

Second Day of December, 2003

JAMES E. ROGAN
*Director of the United States Patent and Trademark Office*